(12) United States Patent
Taylor et al.

(10) Patent No.: US 7,898,244 B2
(45) Date of Patent: Mar. 1, 2011

(54) ELECTROMAGNETIC SENSOR SYSTEMS

(75) Inventors: G. Brandt Taylor, Berlin, MA (US);
Steven E. Beard, Berlin, MA (US)

(73) Assignee: Digisensors, Inc., Berlin, MA (US)

( * ) Notice: Subject to any disclaimer, the term of this patent is extended or adjusted under 35 U.S.C. 154(b) by 745 days.

(21) Appl. No.: 11/846,907

(22) Filed: Aug. 29, 2007

(65) Prior Publication Data

US 2008/0036546 A1    Feb. 14, 2008

Related U.S. Application Data

(63) Continuation-in-part of application No. 11/325,143, filed on Jan. 4, 2006, now Pat. No. 7,511,476, which is a continuation-in-part of application No. PCT/US2005/007363, filed on Mar. 7, 2005.

(60) Provisional application No. 60/841,061, filed on Aug. 30, 2006, provisional application No. 60/841,322, filed on Aug. 31, 2006, provisional application No. 60/853,568, filed on Oct. 23, 2006.

(51) Int. Cl.
*G01B 7/14* (2006.01)
(52) U.S. Cl. .............................. 324/207.24; 324/207.15
(58) Field of Classification Search ................................
324/207.24–207.26, 239, 207.15; 73/862.626,
73/718, 724; 336/10, 30
See application file for complete search history.

(56) References Cited

U.S. PATENT DOCUMENTS

| | | | |
|---|---|---|---|
| 2,452,156 A | 10/1948 | Schover | 177/351 |
| 3,350,660 A | 10/1967 | Engdahl et al. | 331/65 |
| 3,397,364 A | 8/1968 | Crandall | 331/65 |
| 3,461,400 A | 8/1969 | Koda | 331/65 |
| 3,521,158 A | 7/1970 | Morrow et al. | 324/34 |
| 3,609,580 A | 9/1971 | Thompson et al. | 331/65 |
| 3,619,805 A | 11/1971 | Bean | 331/65 |
| 3,701,041 A | 10/1972 | Adler et al. | 331/65 |
| 3,732,503 A | 5/1973 | Rapp et al. | 331/65 |
| 3,735,244 A | 5/1973 | Gumtau et al. | 323/51 |
| 3,756,081 A | 9/1973 | Young | 73/336.5 |
| 3,760,392 A | 9/1973 | Stich | 340/200 |
| 3,818,369 A | 6/1974 | Brocker | 331/65 |
| 3,891,918 A | 6/1975 | Ellis | 324/34 D |
| 4,068,189 A | 1/1978 | Wilson | 331/65 |
| 4,284,961 A | 8/1981 | Landau | 331/65 |
| 4,310,807 A | 1/1982 | McKee | 331/65 |
| 4,618,835 A | 10/1986 | Wilson | 331/65 |
| 4,663,542 A | 5/1987 | Buck et al. | 327/517 |
| 4,809,742 A | 3/1989 | Grau | 137/554 |
| 4,890,494 A | 1/1990 | Osbond | 73/338 |

(Continued)

FOREIGN PATENT DOCUMENTS

WO    WO 97/31274    8/1997

OTHER PUBLICATIONS

International Search Report dated Apr. 17, 2008 for PCT/US07/77186 filed Aug. 30, 2007. Applicant: Digisensors, Inc.

(Continued)

*Primary Examiner*—Bot L LeDynh
(74) *Attorney, Agent, or Firm*—Burns & Levinson LLP; Orlando Lopez

(57) ABSTRACT

Sensor circuits including an oscillator circuit.

22 Claims, 11 Drawing Sheets

U.S. PATENT DOCUMENTS

| | | | |
|---|---|---|---|
| 5,079,502 A | 1/1992 | Rogacki et al. | 324/207.19 |
| 5,142,226 A | 8/1992 | Sakamoto et al. | 324/207.24 |
| 5,172,298 A | 12/1992 | Shimizu et al. | 361/152 |
| 5,767,672 A | 6/1998 | Guichard et al. | 324/236 |
| 6,215,365 B1 | 4/2001 | Kurkovskiy | 331/65 |
| 6,335,619 B1 | 1/2002 | Schwab et al. | 324/207.26 |
| 6,532,834 B1 | 3/2003 | Pinto et al. | 73/862.626 |
| 6,639,759 B2 | 10/2003 | Inoguchi et al. | 360/261.1 |
| 6,731,119 B2 | 5/2004 | Haffner et al. | 324/635 |
| 7,046,018 B2 | 5/2006 | Toda et al. | 324/679 |
| 2004/0056748 A1 | 3/2004 | Masaki et al. | 336/119 |

OTHER PUBLICATIONS

U.S. Appl. No. 60/841,061, filed Aug. 30, 2006.
U.S. Appl. No. 60/841,322, filed Aug. 31, 2006.
U.S. Appl. No. 60/853,568, filed Oct. 23, 2006.
U.S. Appl. No. 06/145,689, Taylor et al., filed Jan. 4, 2006.

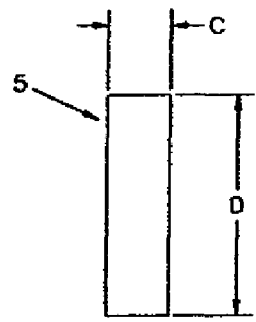
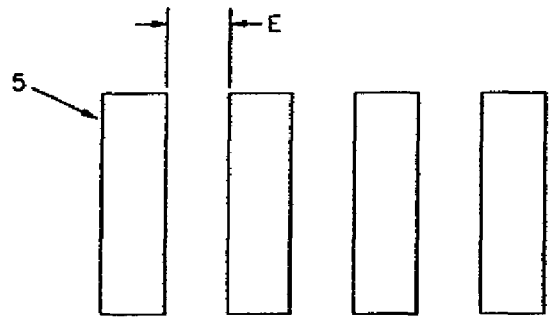
Fig 3a
Fig 3b
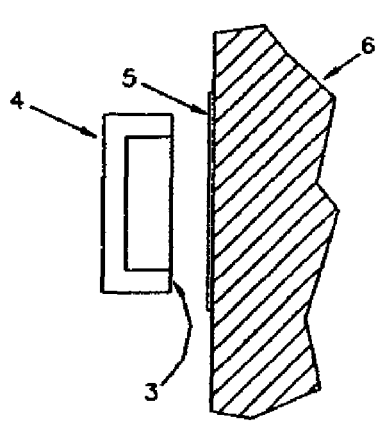
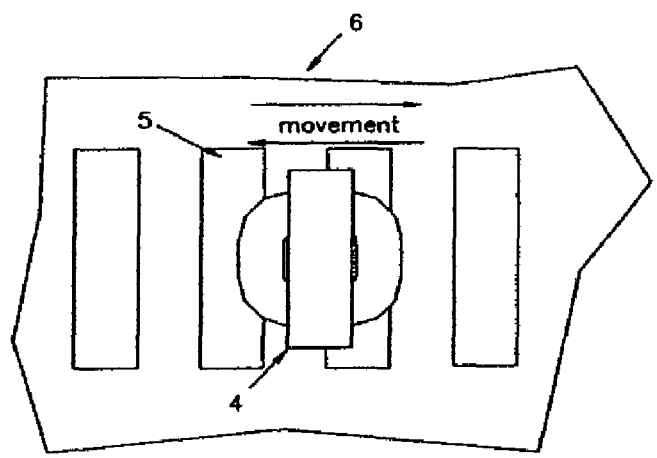
Fig 3c
Fig 3d

ELECTROMAGNETIC SENSOR SYSTEMS

CROSS REFERENCE TO RELATED APPLICATIONS

This application is a continuation-in-part of co-pending U.S. patent application Ser. No. 11/325,143, entitled ELECTROMAGNETIC SENSOR SYSTEMS AND METHODS OF USE THEREOF, filed on Jan. 4, 2006, which is a continuation-in-part of International Application Ser. No. PCT/US2005/007363, filed Mar. 7, 2005, entitled INDUCTION SENSOR, both of which are incorporated by reference herein, and claims priority of U.S. Provisional Patent application Ser. No. 60/841,061, entitled INDUCTION LINEAR SENSOR SYSTEM, filed on Aug. 30, 2006, of U.S. Provisional Patent application Ser. No. 60/841,322, entitled HIGH TEMPERATURE INDUCTIVE SENSOR, filed on Aug. 31, 2006, and of U.S. Provisional Patent application Ser. No. 60/853,568, entitled BRAKE LINING THICKNESS SENSOR, filed on Oct. 23, 2006, all of which are also incorporated by reference herein.

BACKGROUND OF THE INVENTION

These teachings relate to electro-mechanical measurement and control systems.

As digital electronic information processing has improved, the search has developed for digital signal sources to indicate physical parameters for measurement and system control. Interfaces have been developed that allow analog sensing devices to be used with digital controls. However, there remains a need for sensors that have digital output and integrate seamlessly with digital equipment.

When high-speed position measurement is made with conventional devices that employ a magnetic field there is a delay between the actual position and the indicated position. This delay is referred as measurement hysteresis. This measurement hysteresis is undesirable in practice.

Material considerations have discouraged the use of inductive proximity sensors at temperatures above 260° C. Conventionally used copper magnet wire may experience oxidation of the wire and degradation of its insulation at high temperature. Some assembly techniques have used materials that are unsuitable for exposure to high temperatures.

BRIEF SUMMARY OF THE INVENTION

In one embodiment, the system of these teachings includes an oscillator circuit. In one instance, the sensing element is a variable reactance element.

For a better understanding of these teachings, together with other and further needs thereof, reference is made to the accompanying drawings and detailed description and its scope will be pointed out in the appended claims.

BRIEF DESCRIPTION OF THE DRAWINGS

FIGS. 3a-3d depict an embodiment of a component of a physical structure of these teachings;

DETAILED DESCRIPTION

Figure 1A:
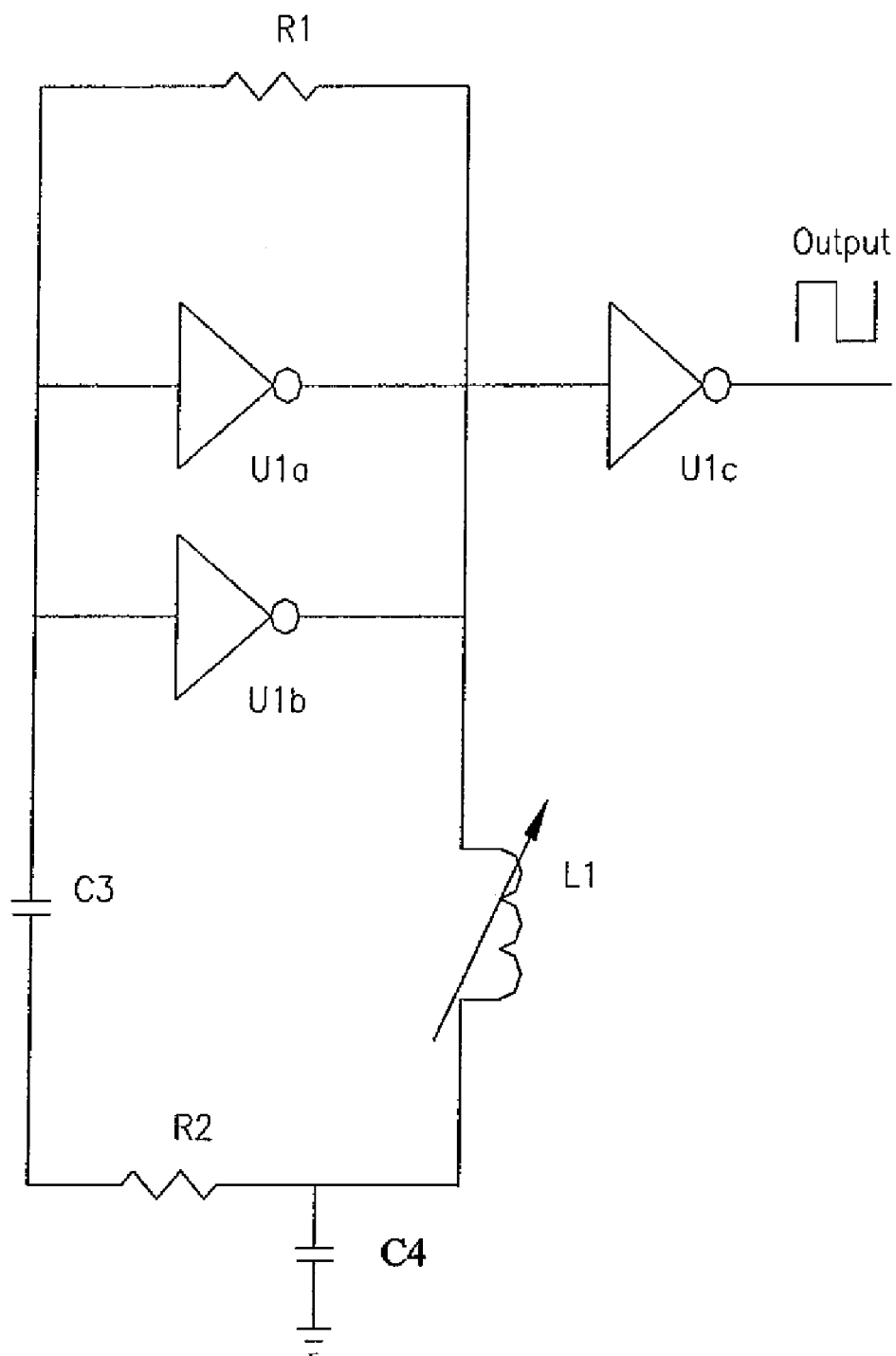
FIG. 1a is a schematic representation of an embodiment of the system of these teachings.

An embodiment of the system of these teachings is shown in FIG. 1a. The circuit shown in FIG. 1a is a tuned oscillator circuit. The tuned oscillator circuit is comprised of an amplifier (U1a, U1b, and U1c) and two reactive components, an inductor L1 and a capacitor C4. L1 and C4 are in series connection with C4 connected to ground (return) and L1 connected to the output of the amplifier (U1a, U1b, and U1c). The frequency of the oscillator is:

$$F = \frac{1}{2\pi\sqrt{L1*C}}$$

In one embodiment, the inductor L1 is a variable inductor and is the sensing component. In that embodiment, the capacitor C4 is a fixed value capacitor (fixed capacitance). In another embodiment, the physical structure that comprises the inductor L1 also exhibits variable capacitance (as, for example, but not limited to, the situation in which the electric and magnetic fields of physical structure are modified while performing a measurement). It should be noted that the conventional sources of DC and oscillator power are not shown in FIG. 1a (or in the subsequent figures, FIGS. 1b, 1c, 1d and 1e). The placement and configuration of such sources is conventional.

In one embodiment, the amplifiers) (having sections U1a, U1b, and U1c) shown in FIG. 1a is a high speed CMOS hex inverter. The resistor R2 can be used to bias the input of the amplifier to compensate for the leakage current. The resistor R3 and capacitor C3 provide the feedback path. The oscillator is AC coupled by capacitor C3 so that there is no DC voltage path through the oscillator. Resistor R2 can influence the feedback path of the circuit. In one embodiment, the resistance value of R2 can chosen so that when the variable reactance is obtained by placing a conducting non magnetic surface, such as, but not limited to, copper, in proximity to a magnetic field producing component, such of variation of reactance will cause will cause the frequency of the circuit to increase, while, when a ferromagnetic surface, such as, but not limited to, steel, is placed proximity to the magnetic field producing component, such a variation will cause the frequency to decrease.

In another embodiment, a transistor amplifier or operational amplifier can be used in place of hex inverter U1a, U1b, and U1c. In one instance, two signals can be generated from the oscillator for use as output. One signal is a square wave and the other signal is a sine wave, both have the same frequency.

Figure 1B:
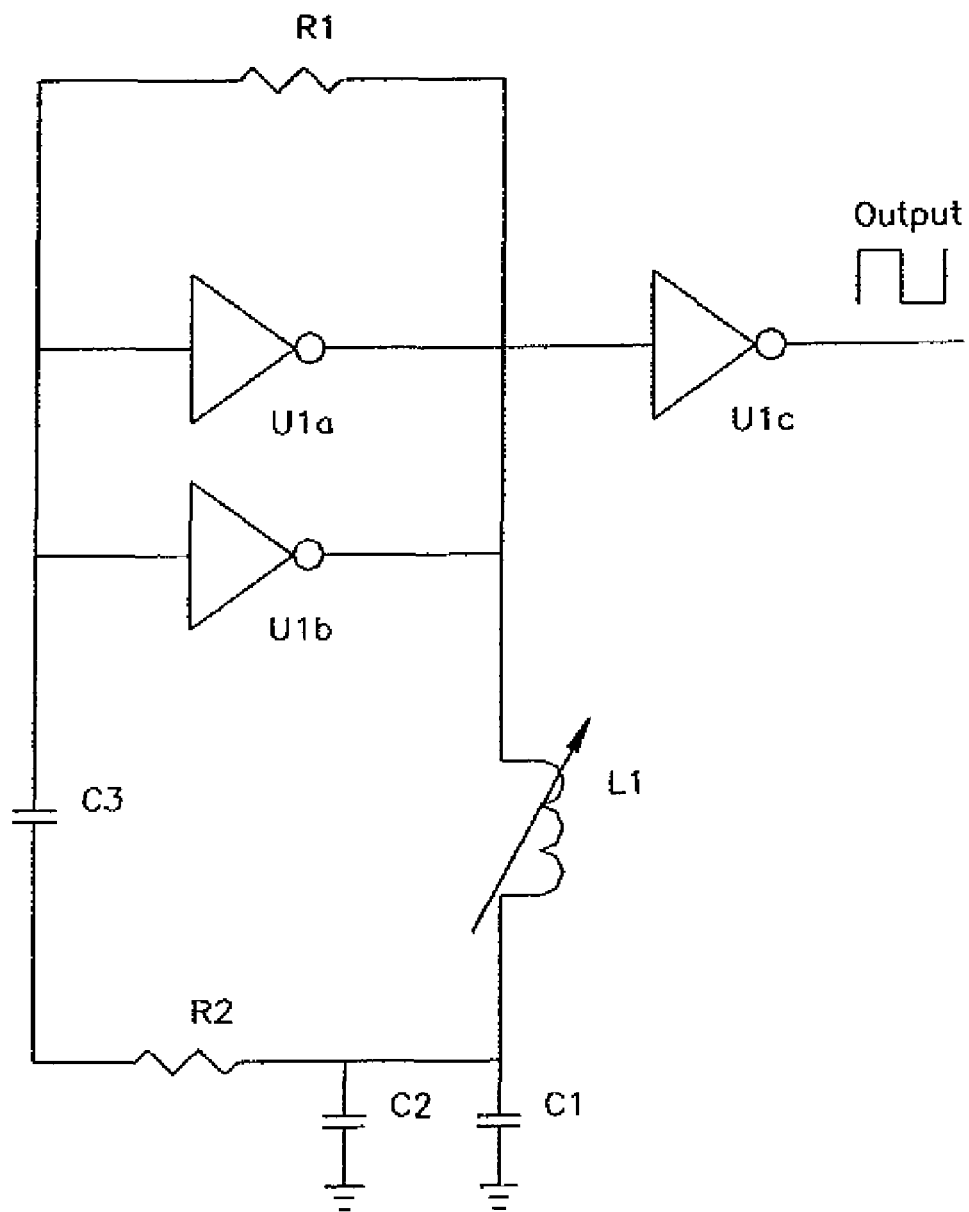
FIG. 1b is a schematic representation of another embodiment of the system of these teachings.

Another embodiment of the system of these teachings is shown in FIG. 1b. In FIG. 1b, Capacitors C1 and C2 replace capacitor C4 of FIG. 1a. Capacitors C1 and C2 are connected in parallel and have an equivalent capacitance equal to the sum of the capacitance of capacitors C1 and C2. In one instance, the two capacitors C1 and C2 provide temperature compensation in the circuit. In that instance, capacitor C1 has a capacitance vs. temperature relation that is positive. Capacitor C2 has a capacitance vs. temperature relation that is negative. By judicious choice of the capacitance values of C1 and C2 temperature induced frequency drift of the sensor output can be minimized. In another embodiment, the capacitance versus temperature relationship of each of the two capacitors C1 and C2 is selected such that a desired variation of the sensor output versus temperature can be obtained. In the embodiment shown in FIG. 1b, U1a, U1b, and U1c are three sections of a 74HC04 hex inverter.

Figure 1C:
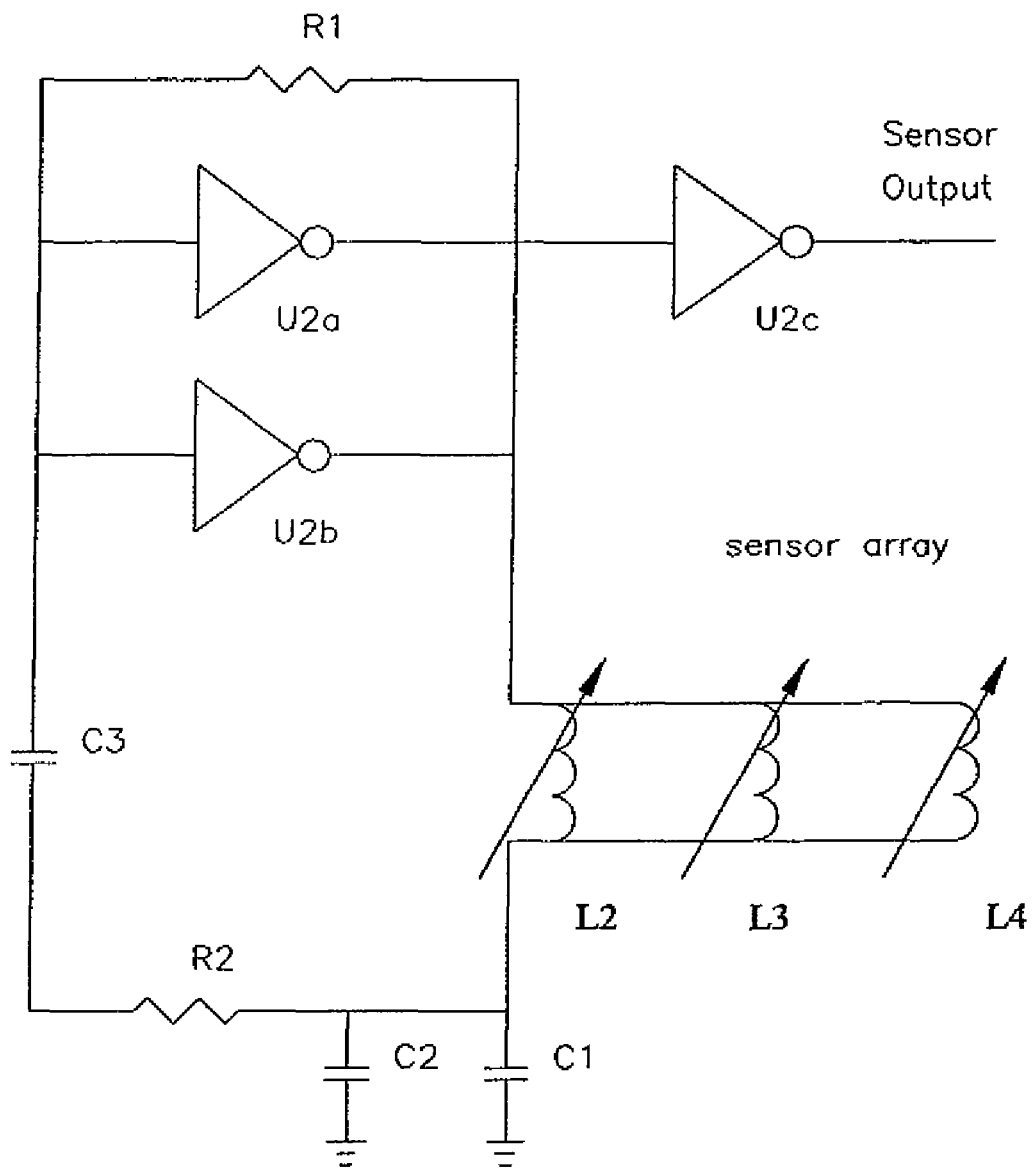
FIG. 1c is a schematic representation of yet another embodiment of the system of these teachings.

Yet another embodiment of the system of these teachings is shown in FIG. 1c. In FIG. 1c, the variable reactance L1 of FIG. 1b is replaced by a number of variable reactances L2, L3, L4, where each one of the variable reactances is connected in parallel to the other variable reactances. In the embodiment of the system of these teachings shown in FIG. 1c, variation of any one of the variable reactances L2, L3, L4 will result in a change in the oscillator frequency.

Figure 1D:
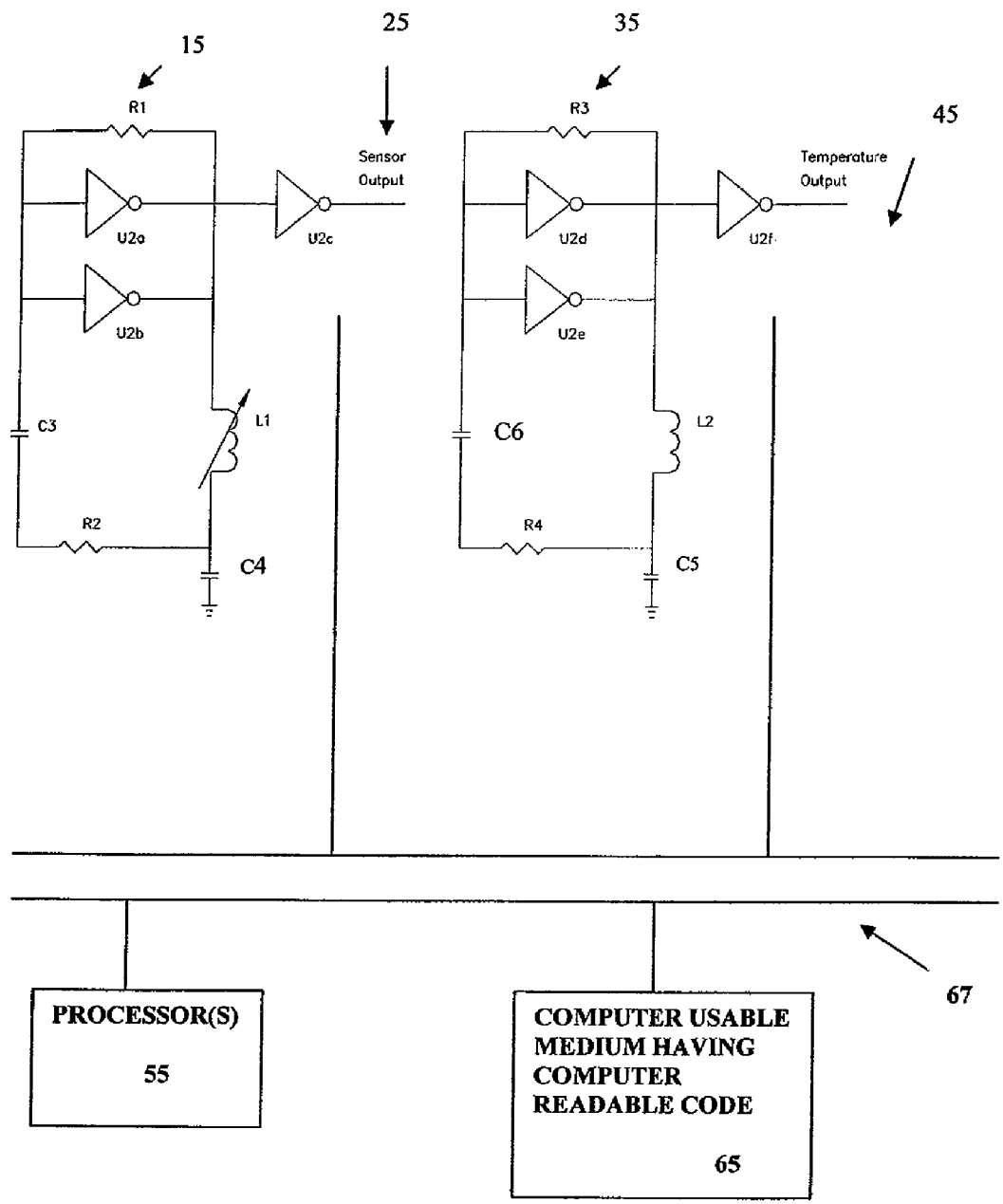
FIG. 1d is a schematic representation of a further embodiment of the system of these teachings.
Figure 1E:
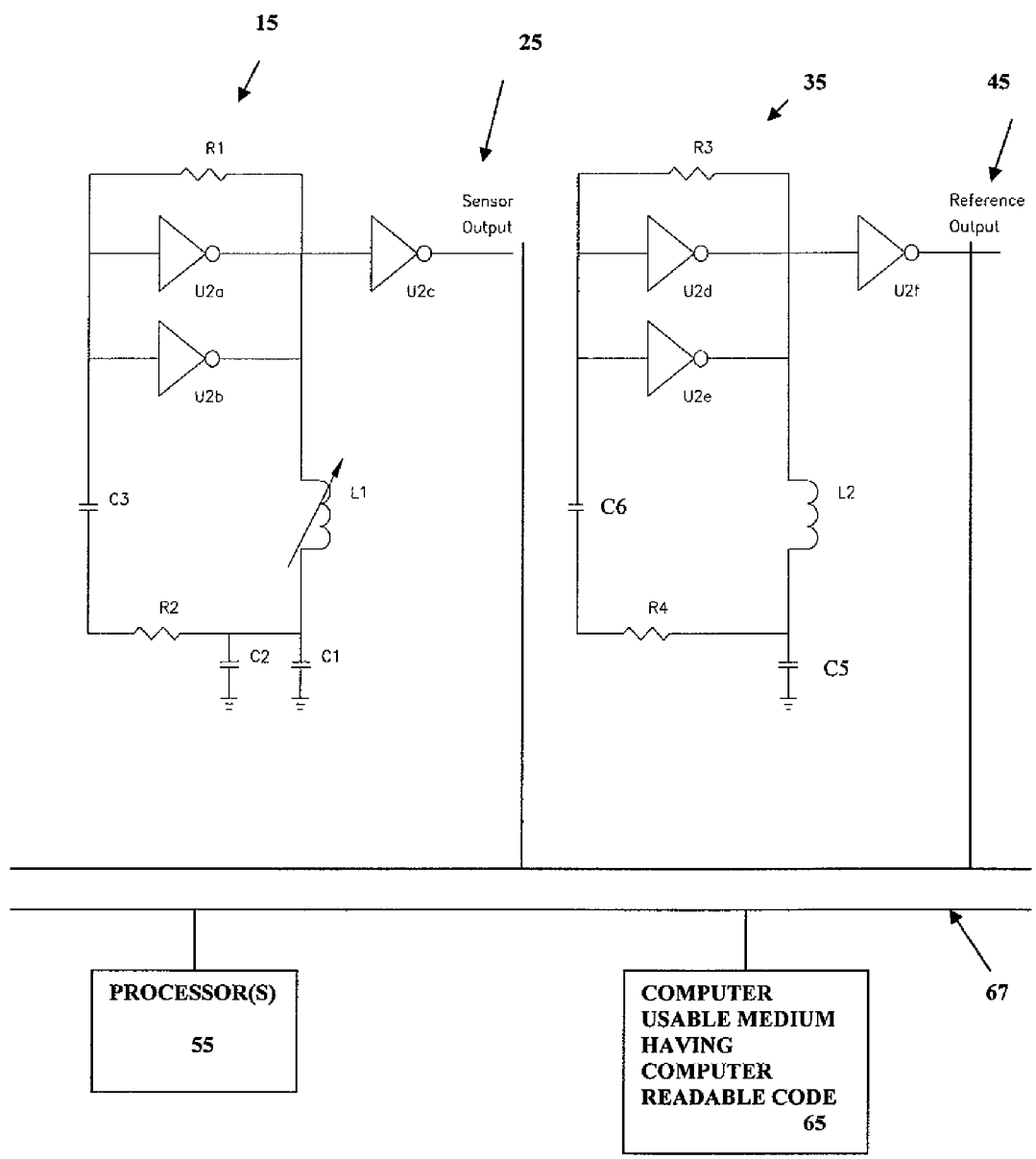
FIG. 1e is a schematic representation of a yet a further embodiment of the system of these teachings.

Further embodiments of the system of these teachings are shown in FIGS. 1d and 1e. Referring to FIG. 1d, the embodiment shown therein includes a first oscillator circuit 15, which in this embodiment is the circuit of FIG. 1a, and a second oscillator circuit 35. The output of the first oscillator circuit 15 is a sensor output 25. The second oscillator circuit 35 has a substantially fixed (other than due to temperature variations) inductor L2, a third capacitor C5, the inductor L2 being separated from ground by the third capacitor C5, a fourth capacitor C6 located in the feedback path from the connection between the inductor L2 and the third capacitor C5 to a second amplifier (U2d, U2e, U2f). The output 45 of the second oscillator circuit 35 is a compensation signal output. The first oscillator circuit 15 is located in substantial proximity to the second oscillator circuit 35 and both the first oscillator circuit 15 and the second oscillator circuit 35 experience substantially a same temperature (in some instances, the variable reactance L1 is located away from the rest of the first oscillator circuit 15). A computer subsystem (such as, but not limited to, a microprocessor subsystem in one instance) receives the sensor output 25 and the compensation signal output 45. The computer subsystem includes one or more processors 55 and one or more computer readable media 65. The computer readable media 65 has computer readable code embodied therein for causing the processors 55 to utilize the compensation signal output 45 in order to substantially compensate the sensor output 25 for temperature induced variations such as, but not limited to, temperature induced drift. The one or more processors 55 and are one or more computer readable media 65 are operatively connected by an interconnection component 67 (for example, a computer bus). The compensation signal output 45 and the sensor output 25 are also provided to the interconnection component 67.

Depending on the nature of the compensation signal output 45 and the sensor output 25, the signals are provided to the interconnection component 67 by different means. If the signals can be provided directly to the digital circuit, a direct connection to the interconnection component 67 is possible. In other instances, the compensation signal output 45 and the sensor output 25 are provided to the interconnection component 67 by interface circuits. The interface circuits are conventionally determined by the nature of the compensation signal output 45 and the sensor output 25 and the digital circuit. The nature of the compensation signal output 45 and the sensor output 25 is determined by a variety of factors including, but not limited to, signal amplitude and signal range.

In one instance, the third capacitor C5 may be chosen with a capacitance versus temperature characteristics that results in a predetermined temperature variation of the compensation signal output 45. In one instance, a substantially large (predetermined) change in output corresponds to to a change in temperature. In one instance, the amplifiers U2d, U2e, U2f are part of the same integrated circuit as the amplifiers U2a, U2b, U2c. (for example, a 74HC04).

Referring to FIG. 1e, the first oscillator circuit 15 in the embodiment shown therein is the same circuit as the circuit of FIG. 1b. The two capacitors C1 and C2 can be selected such that a desired temperature variation of the sensor output 25 is obtained. In one instance, these teachings not being limited only to that instance, the first oscillator circuit 15 and the second oscillator circuit 35 are configured such that the (frequency) sensor output 25 and compensation signal output 45 increase with increasing temperature in a predetermined manner (in one instance, in substantially the same manner). In one possible embodiment, the variable reactance L1 is obtained in a manner that the sensor output 25 (frequency) increases or decreases upon measurement In that embodiment, a predetermined difference between the sensor output 25 (frequency) and the compensation signal output 45 (frequency) will indicate a predetermined measurement.

It should be noted that embodiments of the sensor circuits shown in FIGS. 1d and 1e in which the variable reactance L1 is located at a distance from the rest of the first oscillator circuit 15 (such as the embodiment shown in FIG. 7 below) are within the scope of these teachings.

During measurement, when utilizing the embodiments shown in FIGS. 1d and 1e, a sensor output is obtained from a first oscillator circuit including a variable reactance, a compensation signal output is obtained from a second oscillator circuit having a substantially fixed inductor, and the compensation signal output is utilized in order to substantially compensate the sensor output for temperature variations. An exemplary embodiment is presented hereinabove. Other embodiments in which at least the temperature variation of the second oscillator circuit 35 is substantially predetermined (or designed to be substantially predetermined) are also possible.

Embodiments in which the temperature variation of the second oscillator circuit 35 (and the first oscillator circuit 15 in some instances) is predetermined by calibration or predetermined by design are both within the scope of these teachings.

In one embodiment the variable reactance is obtained from a physical structure. In one instance the physical structure includes a substantially linear element (substantially linear as used herein refers to material properties such as a substantially conducting element or a material having a substantially linear permeability; see, for example, the number of structures 9 in FIG. 3b) and a sensing element for generating electromagnetic fields (see, for example, the sensing element 4 in FIG. 3c). The substantially linear element and the sensing element can move with respect to each other and the spatial relationship between the substantially linear element and the sensing element determines the variable reactance. Embodiments in which the substantially linear element and a sensing element move in a direction substantially parallel to a central axis of the sensing element or move in a direction substantially perpendicular to the central axis of the sensing element are within the scope of these teachings.

Figure 2A:
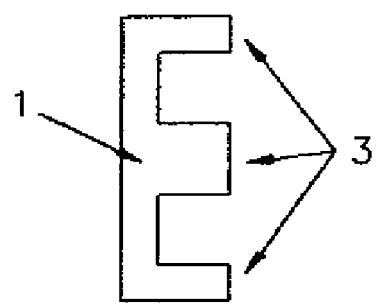
FIGS. 2a-2d depict an embodiment of a sensing element of these teachings.
Figure 2B:
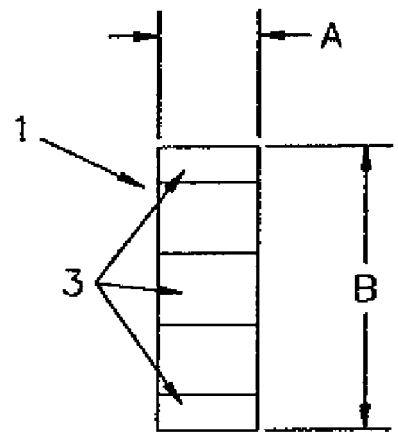
Figure 2C:
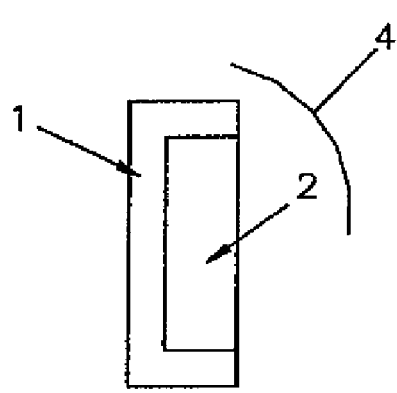
Figure 2D:
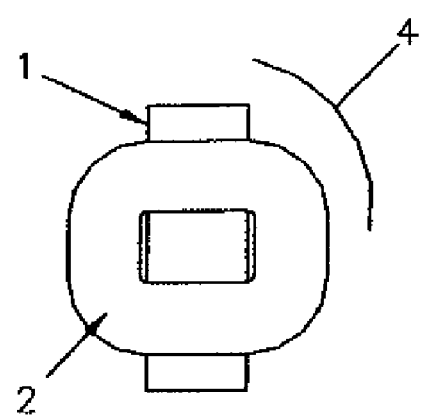

One embodiment of the variable reluctance element (L1 in FIG. 1a, L2, L3 or L4 in FIG. 1c) is shown in FIGS. 2a-2d, FIGS. 3a-3d and FIGS. 4a-4c. Referring to FIGS. 2a-2d, the sensing element shown therein includes a first end portion, a second end portion and a central portion (labeled 3 in FIG. 2a) disposed on a base portion (1, FIGS. 2a-2d) and a coil 2, capable of carrying an electrical current, disposed (or wound) around the central portion 3. The first end portion, the second end portion, the central portion and the base portion are comprised of a substantially magnetic material (a substantially magnetic material, as used herein, refers to a ferromagnetic or a ferrimagnetic material). FIG. 2a and FIG. 2b are two elevations of a sensing element (ferrite core) 4 in a structure conventionally referred to as an E core. The structure shown therein has width dimension "A" and length dimension "B". When the coil 2 is energized by an electrical current, an electromagnetic field is projected from the faces of the end portions and the central portion 3. In one instance, the core shown therein is comprised out of a ferrite material. FIG. 2c and FIG. 2d show two elevations of the ferrite core with electrical coil 2 assembled into a sensing element 4.

In one embodiment, an exemplary instance of which is shown in FIGS. 3a-3d, the substantially linear element includes a number of substructures, where each substructure (5, FIG. 3a) is comprised of a substantially conductive material and a substrate 6, on which the substructures are disposed. In one instance the substrate 6 is comprised of a substantially magnetic material. Each substructure has a characteristic dimension representative of height above the substrate 6 (in the embodiment shown in FIGS. 3a-3d, the characteristic dimension is the thickness of the foil). Each substructure 5 is disposed at a predetermined distance from the adjacent substructure (forming a linear array of substructures).

In one exemplary embodiment, these teachings not be limited only to that exemplary embodiment, each substructure is a rectangle of metal foil (a substructure having a substantially planar rectangular surface and another substantially planar surface, the two surfaces being disposed at a predetermined distance from each other) that has width dimension "C" and length dimension "D". The metal foil is made of non magnetic electrically conducting material, such as, but not limited to, copper or aluminum and may, in an exemplary embodiment, have thickness of 0.003 inches. Width dimension "C" is, in one exemplary instance, the same or greater than dimension "A" of sensing element 4 shown in FIG. 2c. Length dimension "D" may, in an exemplary instance, be equal to length dimension "B" of sensing element 4. Length dimension "D" may also be greater than length dimension "B" in which case the increased length dimension "D" may compensate for lateral misalignment of sensor 4 in its travel. FIG. 3b shows an array of sensor target elements in relation to each other for use in one embodiment of these teachings. In general the elements 5 are arranged to make a uniform pattern (in one instance, similar to teeth of a rack gear). The distance "E" between each element 5 may be equal to or greater than dimension "C". FIG. 3c and FIG. 3d show the substructures 5 in relation to substrate 6 and sensing element 4 as used in one embodiment of these teachings. Elements 5 are fixed to substrate 6 in the pattern shown in FIG. 2b. In one instance, the substrate 6 is a substantially magnetic material as steel, iron, or ferrite. Sensing element 4, in one instance, is positioned so that face of sensing element 4 is substantially parallel to the substructures 5 on substrate 6. The sensing element 4, in one embodiment, moves in a direction substantially perpendicular to dimension "D" of substructures 5, as indicated in FIG. 3d, in such a manner as to traverse over the substructures 5.

Figure 4A:
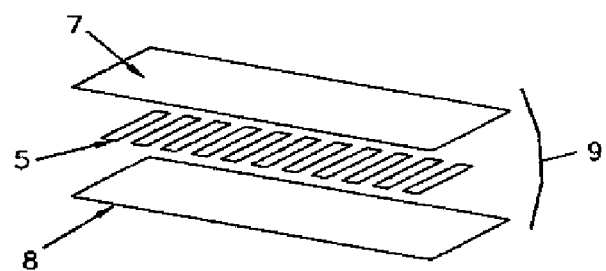
FIGS. 4a-4c show another embodiment of a component of a physical structure of these teachings.
Figure 4B:
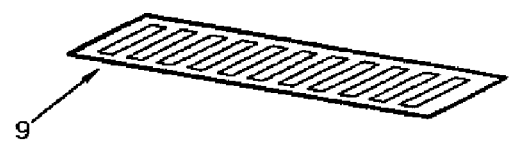
Figure 4C:
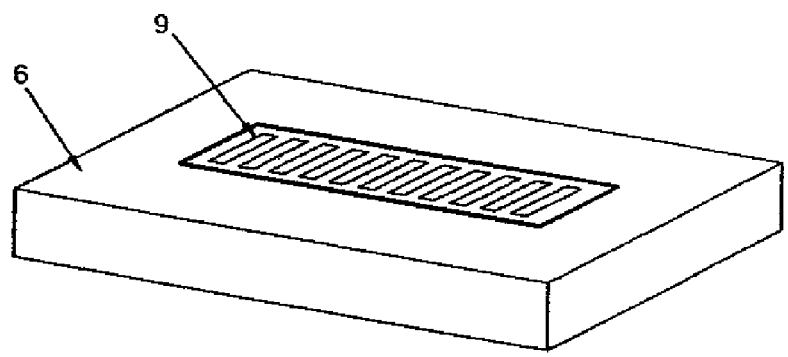

In another embodiment, shown in FIGS. 4a-4c, the substantially linear element includes a first laminate layer 7 having a substantially adhesive surface. The first laminate layer 7 is disposed over the substructures 5. The substantially adhesive surface is adjacent to the substructures 5. The substantially linear element also includes a second laminate layer 8 having two substantially adhesive surfaces. The substructures 5 are disposed over one of the two substantially adhesive surfaces. Another one of the two substantially adhesive surfaces is disposed over the substrate 6. In one exemplary embodiment, not a limitation of these teachings, the first laminate layer 7 may be a self-adhesive flexible polyester tape with glass filament reinforcements. The second laminate layer 8 may be self-adhesive tape with adhesive on both surfaces (for example, double-sided adhesive tape). One adhesive surface is applied to the substructures. The other adhesive surface is applied to a substrate 6, which in one embodiment is comprised of a substantially magnetic material.

In an exemplary application of the circuit of these teachings shown in FIG. 1a or 1b, and the sensing element and substantially linear element shown in FIGS. 3a-3d, the frequency output of the circuit of FIG. 1a or 1b can be provided as input to a microprocessor. In one instance, the output is utilized by the microprocessor in order to count each time the frequency attain some value in the midpoint of the range of frequencies. In one exemplary embodiment (not a limitation of these teachings), if the frequency attains a value of 74 kHz when the face of the sensing element 4 is adjacent to a substructure 5 and the frequency attains a value of 66 kHz when the face of the sensing element 4 is adjacent to a region of the substrate 6 between two substructures 5, then a count or pulse (indicative that the sensing element 4 is at a location near the edge of the substructure 5) can be generated when the frequency attains a value of 69 kHz. The counts can be summed and from knowledge of the distance between the substructures, an indication of distance can be determined from the sum.

In order to better illustrate the present teachings, another exemplary embodiment is disclosed hereinbelow. In the exemplary embodiment, not a limitation of these teachings, a coil of 170 turns of 34 AWG wire is assembled into a ferrite core of dimension ⅛ inch width and ½ inch length in order to form the sensing element 4. Copper elements comprising the substructures 5 have dimension ⅛ inch×½ inch each and each element has thickness of 0.003 inch. The glass re enforced polyester lamination 9 has thickness 0.012 inches and is attached to a mild steel substrate 6.

In yet another embodiment of the system of these teachings, in order to operate above a predetermined temperature, the sensing element is comprised of a material having a Curie temperature above the predetermined temperature. In one instance, the coil 2 of FIG. 2d is encapsulated in a ceramic material. In another instance, after placing the encapsulated coil around the center portion of the core (as in FIG. 2d), the sensing element 4 is encapsulated in a ceramic material.

An embodiment of an encapsulated sensing element is shown in FIGS. 5a-5f and 6a-6c. Referring to FIGS. 5a-5f, a core is shown therein having a first side portion 12, a second side portion 12, a center portion 14 and a base portion 16. The base portion 16 has a surface with a substantially circular area. Each of the side portion 12 are disposed along a portion of the half-circumference of the substantially circular area and the center portion 14 has a cross-sectional area that is smaller than the substantially circular area of the base portion 16. The coil 20 is disposed around the center portion 14 and between the center portion 14 and the side portions 12. The wire comprising the coil 20 is encapsulated in a ceramic material. Leads 30 allow providing an electrical current to the coil 20.

In one exemplary embodiment, these teachings not being limited only to the exemplary embodiment, the coil 20 is made by winding aluminum magnet wire that has been anodized. The anodized surface on the wire provides electrical insulation for the wire. As the wire is wound onto a form to make the coil, ceramic cement is applied to the wire. The cement is allowed to cure and then the coil is removed from the winding tool. The cement used may be one of a number of conventional cements used for encapsulating or joining electrical heating elements and electrical lighting elements. (For example, these teachings not being limited only to this example, one source for the cement is Sauereisen.)

The material of the core 10 is chosen to have a Curie temperature above the temperature at which the sensing element will operate. In an exemplary embodiment (not a limitation of these teachings), the core 10 is a ferrite core. Many types of soft ferrite are conventionally available. For any particular sensing element, a ferrite material is chosen that has at least a predetermined magnetic permeability at the temperature at which the sensing element will operate. For a high temperature sensing element, a material is chosen with a Curie temperature above the temperature at which the sensor will operate. There are various NiZn ferrite materials that have a Curie temperature above 320° C. These ferrite materials can be used to make inductive proximity sensors that will operate at these high temperatures. (In one exemplary embodiment, these teachings not being limited to only that embodiment, one source for the ferrite material is Ferroxcube).

Figure 5A:
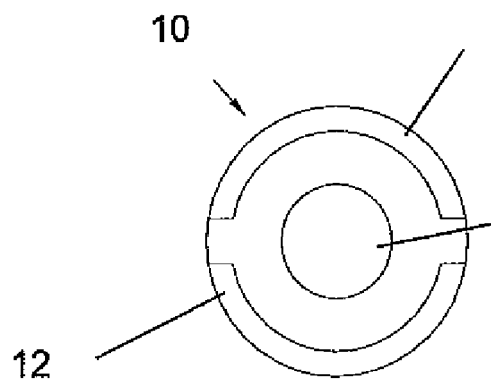
FIGS. 5a-5f and 6a-6c show another embodiment of a sensing element of these teachings.
Figure 5B:
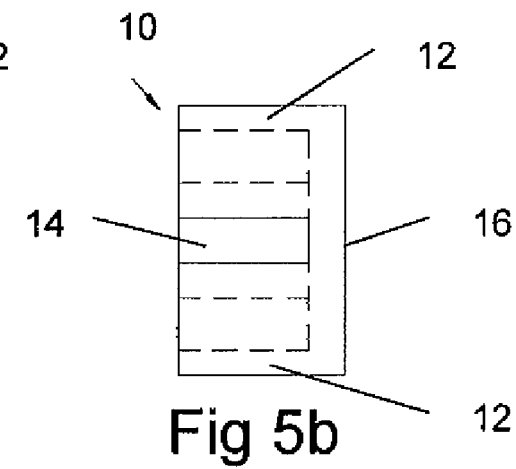
Figure 5C:
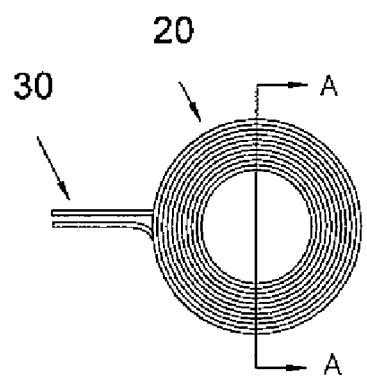
Figure 5D:
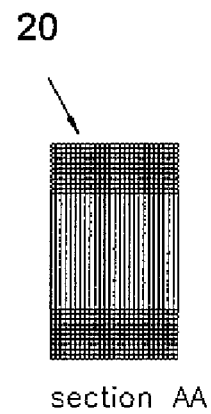
Figure 5E:
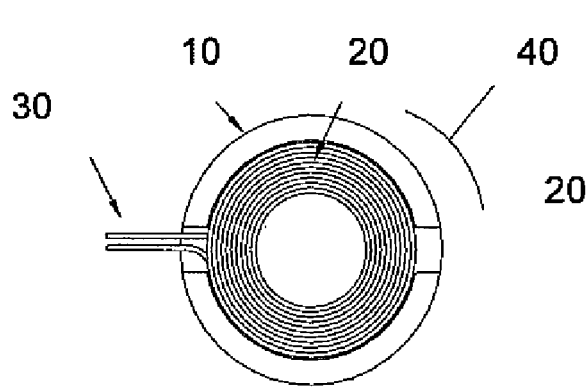
Figure 5F:
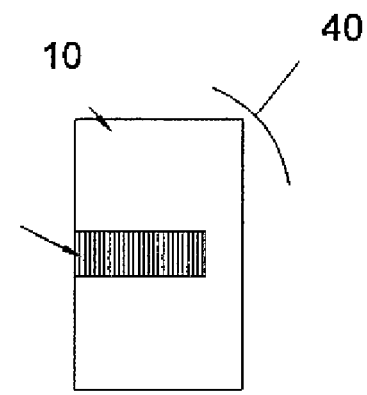
Figures 6A, 6B:
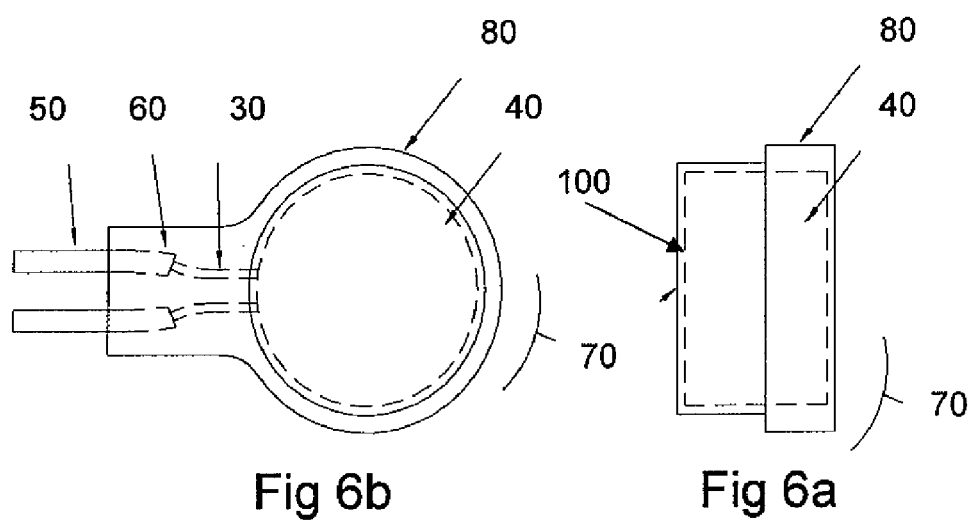
Figure 6C:
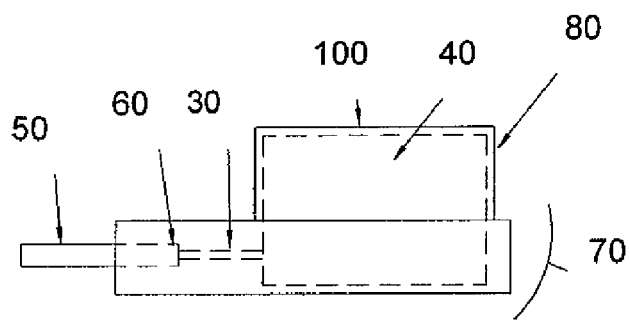

In the embodiment shown in FIGS. 5e and 5f, the coil 20 is assembled onto/into the core 10 of FIG. 5a. The assembled sensing element is then encapsulated in a ceramic material. FIGS. 6a-6c show and embodiment of the encapsulated sensing elements corresponding to the sensing element of FIGS. 5a-5f. The encapsulated sensing element includes the sensing elements 40 that has been encapsulated in a shell 80 of ceramic cement. Coil leads 30 may be joined to sensor leads 50 by crimping, welding, or brazing connections 60. The shell 80 encloses the sensing element 40 of FIGS. 5e and 5f and wire connections 60 and substantially prevents air (ambient gas) from coming in contact with the contents of the shell 80. In one instance, not a limitation of these teachings, shell 80 is formed by suspending the sensing element 40 with attached connections 60 to sensor leads 50 in a mold and filling the mold cavity with ceramic cement.

Figure 7:
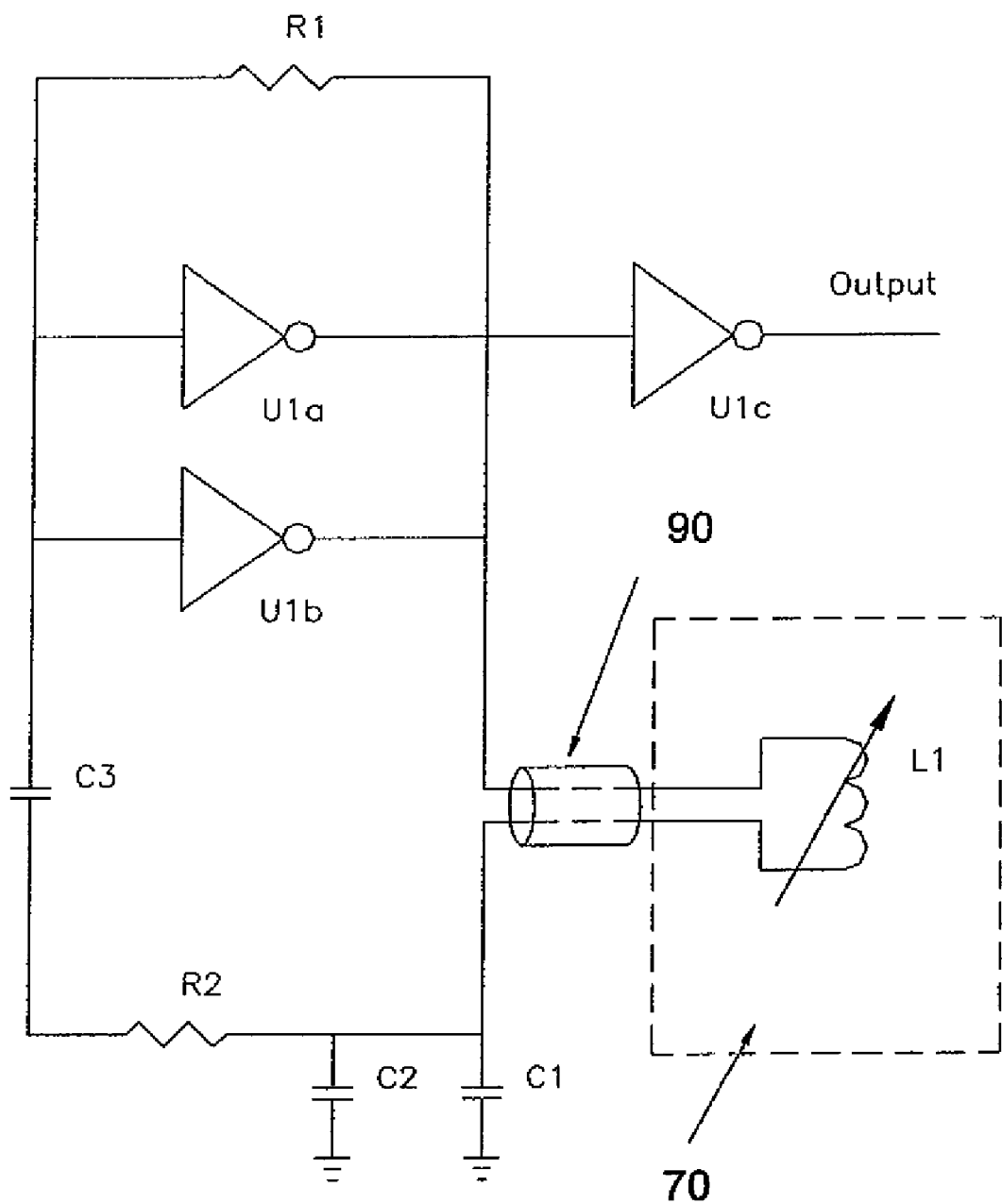
FIG. 7 depicts a schematic representation of a further embodiment of the system of these teachings.

FIG. 7 shows the embodiment shown in FIG. 1b of the sensor circuit of the present teachings with the encapsulated sensing element 70 of FIG. 6c. It should be noted that these teachings are not limited only to the embodiment shown in FIG. 1b. Other embodiments, for example, such as those shown in FIG. 1a or 1c, are also within the scope of these teachings. In the embodiment shown in FIG. 7, the sensing element 70 is separated from the rest of the sensor circuit by cable 90 so as to prevent the high temperature that affects the sensing element 70 from affecting the other components in the circuit.

While exemplary embodiments including specific materials have been disclosed hereinabove, it should be noted that these teachings are not limited to only those embodiments and all our exemplary embodiments are also within the scope of these teachings.

Not desiring to be bound by theory, the embodiments described above are not limited by the description of the physical mechanisms detailed above.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. From a technological standpoint, a signal or carrier wave (such as used for Internet distribution of software) encoded with functional descriptive material is similar to a computer-readable medium encoded with functional descriptive material, in that they both create a functional interrelationship with a computer. In other words, a computer is able to execute the encoded functions, regardless of whether the format is a disk or a signal.

Although these teachings have been described with respect to various embodiments, it should be realized these teachings are also capable of a wide variety of further and other embodiments within the spirit and scope of the appended claims.

What is claimed is:

1. A sensor circuit comprising:
   an oscillator circuit, said oscillator comprising:
      a variable reactance; and
      a first capacitor and a second capacitor; said first capacitor being connected in parallel to said second capacitor;
         said first capacitor and said second capacitor providing an electrical connection between ground and said variable reactance;
      a capacitance of said first capacitor increasing with temperature; a capacitance of said second capacitor decreasing with temperature; and
      a value of said capacitance of said first capacitor at a predetermined temperature and a value of said capacitance of said second capacitor at said predetermined temperature being selected to substantially reduce temperature induced drift of an output of the sensor circuit;
   another capacitor; and
   an amplifier;
      wherein said another capacitor being located in a feedback path from the connection between said variable reactance and said first and second capacitors to said amplifier.

2. The sensor circuit of claim 1 wherein output is provided as an oscillatory signal having a frequency.

3. The sensor circuit of claim 1 wherein said variable reactance is obtained from a physical structure.

4. The sensor circuit of claim 3 wherein said physical structure comprises:
   a substantially linear element;
   a sensing element capable of generating electromagnetic fields;

said substantially linear element and said sensing element being movable with respect to each other; and a spatial relationship between said substantially linear element and said sensing element determining said variable reactance.

5. The sensor circuit of claim 4 wherein said substantially linear element comprises:
   a plurality of substructures; each substructure from said plurality of substructure comprised of a substantially conductive material; and,
   a substrate; said plurality of substructures being disposed on said substrate;
   each substructure from said plurality of substructures having a characteristic dimension representative of a height above said substrate; and
   each substructure from said plurality of substructures being disposed at a predetermined distance away from an adjacent substructure from said plurality of substructures.

6. The sensor circuit of claim 5 wherein said substrate is comprised of a substantially magnetic material.

7. The sensor circuit of claim 5 further comprising:
   a first laminate layer having a substantially adhesive surface; said first laminate layer being disposed over said plurality of substructures; said substantially adhesive surface being adjacent to said plurality of substructures; and
   a second laminate layer having two substantially adhesive surfaces; said plurality of substructures being disposed over one of said two substantially adhesive surfaces; another one of said to substantially adhesive layers being disposed over said substrate.

8. The sensor circuit of claim 5 wherein each substructure from said plurality of substructures comprises:
   a rectangular substantially planar surface; and
   another substantially planar surface; said another substantially planar surface being disposed at a predetermined distance from said rectangular substantially planar surface;
   said another substantially planar surface being proximate to said substrate.

9. The sensor circuit of claim 4 wherein said sensing element comprises a material having a Curie temperature above a predetermined temperature.

10. The sensor circuit of claim 4 wherein said sensing element comprises:
    a first end portion;
    a second end portion;
    a base portion connecting said first end portion and said second end portion and on which said first end portion and said second end portion are disposed;
    a central portion disposed on said base portion and spaced apart from said first end portion and said second end portion; and
    a coil disposed around said central portion; said coil being capable of carrying an electrical current;
    said first end portion, said second end portion, said central portion and said base portion being comprised of a substantially magnetic material.

11. The sensor circuit of claim 10 wherein said sensing element comprises a material having a Curie temperature above a predetermined temperature.

12. The sensor circuit of claim 10 wherein wire in said coil is encapsulated in a ceramic material.

13. The sensor circuit of claim 11 wherein said sensing element is encapsulated in a ceramic material.

14. A sensor circuit comprising:
    an oscillator circuit, said oscillator comprising:
       a variable reactance; and
       a first capacitor and a second capacitor; said first capacitor being connected in parallel to said second capacitor;
       said first capacitor and said second capacitor providing an electrical connection between ground and said variable reactance;
    a capacitance of said first capacitor increasing with temperature; a capacitance of said second capacitor decreasing with temperature; and
    a value of said capacitance of said first capacitor at a predetermined temperature and a value of said capacitance of said second capacitor at said predetermined temperature being selected to substantially reduce temperature induced drift of an output of the sensor circuit; and
    wherein said variable reactance comprises at least two variable reactance components; each one of said at least two variable reactance components being connected in parallel to each other one of said at least two variable reactance components.

15. A sensor circuit comprising:
    an oscillator circuit, said oscillator comprising:
       a variable reactance; and
       a capacitor;
       said variable reactance being separated from ground by the capacitor;
       said variable reactance being obtained from a physical structure, said physical structure comprising:
          a substantially linear element; and
          a sensing element capable of generating electromagnetic fields;
          said substantially linear element and said sensing element being movable with respect to each other;
          said substantially linear element comprising:
             a plurality of substructures; each substructure from said plurality of substructure comprised of a substantially conductive material; and
             a substrate; said plurality of substructures being disposed on said substrate; said substrate comprised of a substantially magnetic material;
             each substructure from said plurality of substructures having a characteristic dimension representative of a height above said substrate; and
             each substructure from said plurality of substructures being disposed at a predetermined distance away from an adjacent substructure from said plurality of substructures;
          a spatial relationship between said substantially linear element and said sensing element determining said variable reactance.

16. The sensor circuit of claim 15 further comprising:
    another capacitor; and
    an amplifier;
    said another capacitor being located in a feedback path from the connection between said variable reactance and said capacitor to said amplifier.

17. The sensor circuit of claim 15 further comprising:
    a first laminate layer having a substantially adhesive surface; said first laminate layer being disposed over said plurality of substructures; said substantially adhesive surface being adjacent to said plurality of substructures; and a second laminate layer having two substantially adhesive surfaces; said plurality of substructures being disposed over one of said two substantially adhesive surfaces; another one of said to substantially adhesive layers being disposed over said substrate.

18. The sensor circuit of claim 15 wherein each substructure from said plurality of substructures comprises:
a rectangular substantially planar surface; and
another substantially planar surface; said another substantially planar surface being disposed at a predetermined distance from said rectangular substantially planar surface;
said another substantially planar surface being proximate to said substrate.

19. A sensor circuit comprising:
an oscillator circuit, said oscillator comprising:
a variable reactance; and
a capacitor;
said variable reactance being separated from ground by the capacitor;
said variable reactance being obtained from a physical structure, said physical structure comprising:
a substantially linear element; and
a sensing element capable of generating electromagnetic fields;
said substantially linear element and said sensing element being movable with respect to each other;
said sensing element comprising:
a first end portion;
a second end portion;
a base portion connecting said first end portion and said second end portion and on which said first end portion and said second end portion are disposed;
a central portion disposed on said base portion and spaced apart from said first end portion and said second end portion; and
a coil wound on said central portion; said coil being capable of carrying an electrical current;
said first and portion, said second and portion said central portion and said base portion being comprised of a substantially magnetic material;
said substantially magnetic material having a Curie temperature above a predetermined temperature;
wire in said coil being encapsulated in a ceramic material; and
said sensing element being encapsulated in a ceramic material.

20. The sensor circuit of claim 19 further comprising:
another capacitor; and
an amplifier;
wherein said another capacitor being located in a feedback path from the connection between said variable reactance and said capacitor to said amplifier.

21. A sensor system comprising:
a first oscillator circuit, said first oscillator circuit comprising:
a variable reactance; and
at least one first capacitor;
said variable reactance being separated from ground by said at least one first capacitor;
a second capacitor; and
a first amplifier;
said second capacitor being located in a feedback path from the connection between said variable reactance and said first capacitor to said first amplifier; an output of said first amplifier being a sensor output;
a second oscillator circuit, said second oscillator circuit comprising:
and inductor; and
a third capacitor;
said inductor being separated from ground by said third capacitor;
a fourth capacitor; and
a second amplifier;
said fourth capacitor being located in a feedback path from the connection between said inductor and said third capacitor to said second amplifier; an output of said second amplifier being a compensation signal output;
said first oscillator circuit being located in proximity to said second oscillator circuit and experiencing substantially a same temperature;
at least one processor; and
at least one computer usable medium having computer readable code embodied therein, said computer readable code being capable of causing said at least one processor to:
utilize said compensation signal output in order to substantially compensate said sensor output for temperature induced variations;
said at least one processor, said at least one computer usable medium and means for receiving said compensation signal output and said sensor output being operatively connected.

22. The sensor system of claim 21 wherein said at least one first capacitor comprises two capacitors connected in parallel, a temperature dependence of each one of said two capacitors being preselected to obtain a predetermined temperature variation of said sensor output.

* * * * *

UNITED STATES PATENT AND TRADEMARK OFFICE
CERTIFICATE OF CORRECTION

| | | Page 1 of 1 |
|---|---|---|
| PATENT NO. | : 7,898,244 B2 | |
| APPLICATION NO. | : 11/846907 | |
| DATED | : March 1, 2011 | |
| INVENTOR(S) | : G. Brandt Taylor et al. | |

It is certified that error appears in the above-identified patent and that said Letters Patent is hereby corrected as shown below:

In Column 9, line 9 (claim 5), "plurality of substructure" should read -- plurality of substructures --

In Column 9, line 31 (claim 7), "said to substantially adhesive layers" should read -- said two substantially adhesive layers --

In Column 11, line 39 (claim 19), "said first and portion, said second and portion" should read -- said first end portion, said second end portion, --

In Column 12, line 16 (claim 21), "and inductor;" should read -- an inductor; --

Signed and Sealed this
Fifth Day of April, 2011

David J. Kappos
*Director of the United States Patent and Trademark Office*